Aug. 14, 1956 S. RYAN 2,758,807
EXPLOSIVE CARTRIDGE RETRACTION OF LANDING GEAR
Filed July 18, 1952 2 Sheets-Sheet 1

INVENTOR:
Stanley Ryan
BY Herbert E. Metcalf
HIS PATENT ATTORNEY

Aug. 14, 1956  S. RYAN  2,758,807
EXPLOSIVE CARTRIDGE RETRACTION OF LANDING GEAR
Filed July 18, 1952  2 Sheets-Sheet 2
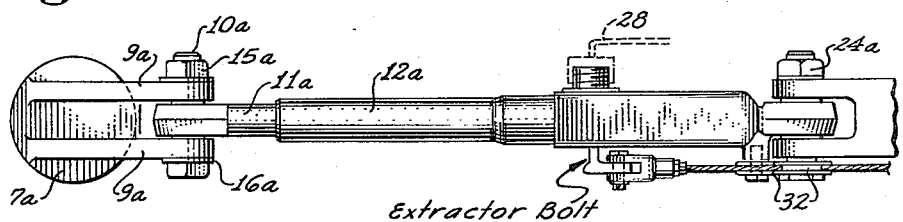
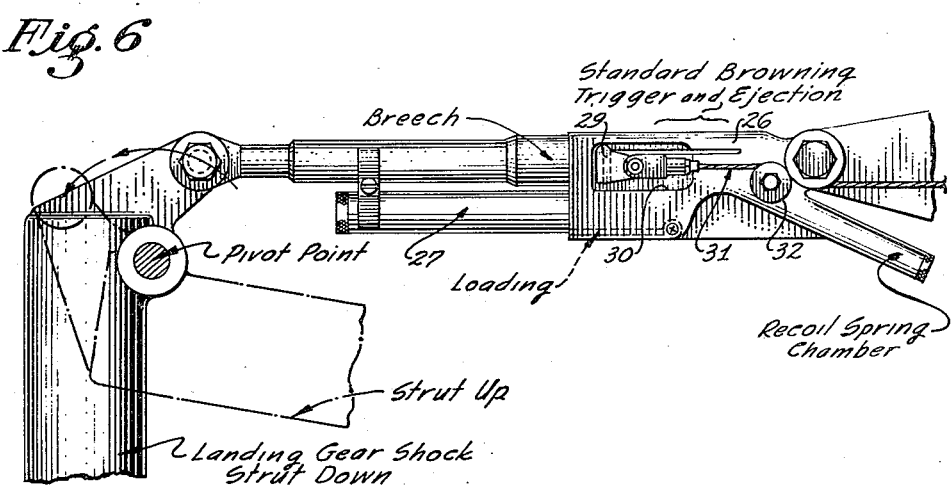
INVENTOR:
Stanley Ryan
By Herbert E. Metcalf
HIS PATENT ATTORNEY

2,758,807

EXPLOSIVE CARTRIDGE RETRACTION OF LANDING GEAR

Stanley Ryan, Long Beach, Calif., assignor to Northrop Aircraft, Inc., Hawthorne, Calif., a corporation of California Application July 18, 1952, Serial No. 299,593

2 Claims. (Cl. 244—102)

My invention relates to retractable landing gear for aircraft, and has for its general object the simplification of such gear.

Light planes are usually provided with mechanically operated landing gear, which since it must be entirely reliable in operation and therefore of strong construction, adds considerable weight to the plane structure as well as adding to the cost of production. Heavy planes are usually provided with hydraulic gear to extend and retract the landing gear.

In high speed planes it may be important to retract the landing gear as quickly as possible in order to reduce the drag caused by the landing gear before it is fully retracted and housed in the very carefully streamlined plane structure.

With the above considerations in view it is an object of the invention to provide an airplane landing gear incorporating telescopic members adapted to be operated by the gas pressure developed by firing an explosive charge contained in a cartridge loaded into a chamber provided between and enclosed by the telescopic members thereby reducing the weight of the gear usually provided.

It is a further object of the invention to provide landing gear operating mechanism energized by an explosive charge, the mechanism being simple in construction and readily serviced in the field.

Still further objects and features of the invention will hereinafter appear from the specification following read in conjunction with the accompanying illustrative drawings.

My invention comprises mechanism for airplane landing wheel operation in which pivotally mounted struts on which the landing wheels are mounted are swung about the pivots by gas pressure released from a cartridge fired in a chamber communicating the pressure to the members of a telescopic strut connected between the pivoted struts and fixed abutments mounted on the plane structure.

In the drawings:

Figure 5 is a fragmentary plan view of a modified form of the invention fitted with a magazine for explosive cartridges, and Figure 6 is a side elevation of the parts shown in Figure 5.

Figure 1:
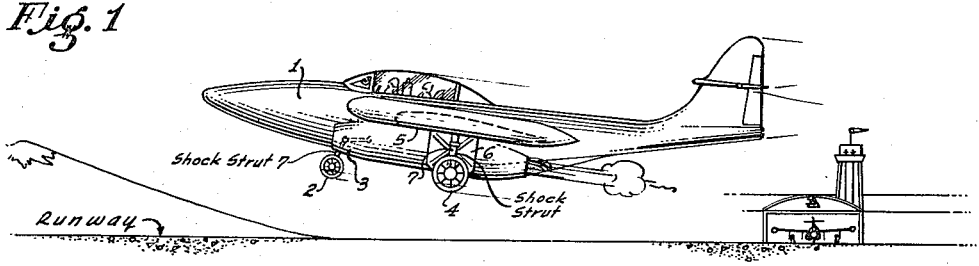
Figure 1 is a view showing a fast plane equipped with tricycle landing gear which folds into the fuselage, pod, or wing when retracted.

In the drawings the numeral 1 indicates the fuselage of the plane fitted with a nose wheel 2 which can be withdrawn into a wheel well covered by flaps, and side wheels 4 which may be retracted into wheel wells in the wings 5 covered by flaps 6.

The wheels are mounted in shock struts 7. The mounting of the nose wheel 2 is typical and the description of the nose wheel mounting following applies equally to that of the side wheels.

Figure 2:
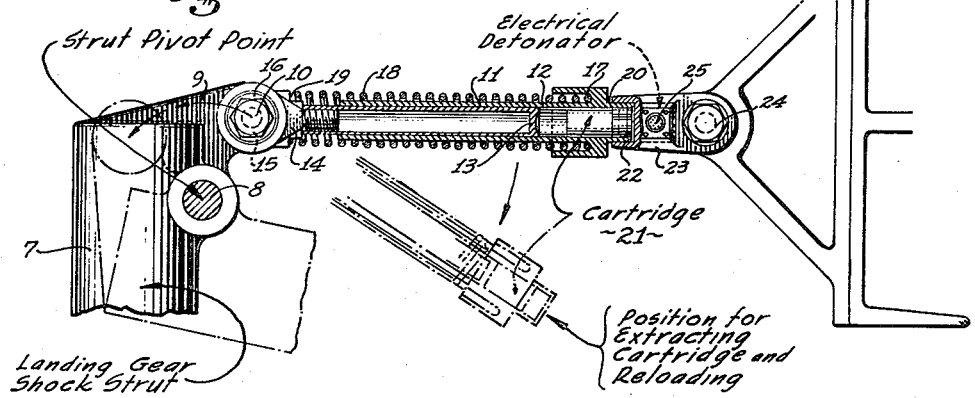
Figure 2 is a fragmentary side elevation drawn on a larger scale and partly in section, showing wheel mounting means in extended position and adapted to be retracted by the use of an explosive charge contained in a cartridge.

The shock strut 7 is pivoted on an axle 8 supported suitably in the plane structure 8, Figure 2. The strut 7 extends upwardly above the axle 8 in a horn 9 providing a bearing for a pin 10.

A telescopic member 11, 12 is provided with the inner member 11 having a closed inner end 13, and threaded at its outer end to receive a forked head 14 pivoted on shouldered pin 10. Pin 10 may be held in position in any suitable way as for instance by nuts 15 and washers 16. Outer member 12 is provided with an undercut flange 17 inwardly of the end opposite to head 14. A coil spring 18 is mounted around the outer member 12 between a seat 19 provided on the head and flange 17.

The tubular inner end 20 of member 12 is adapted to receive an explosive cartridge 21 to fit into a socket 22 formed in a breech block member 23 pivotally mounted at 24 in any suitable manner on the plane structure aft of the forward pivot of the telescopic member 11, 12, spring 18 acting to firmly engage end 20 of the outer member in the socket.

The breech block member 23 may be fitted with a plug 25 for electrical ignition means of any suitable type such as those shown in U. S. Patent 2,289,318 which comprise a resistance wire positioned within the cartridge to ignite when energized a small body of flash composition embedded in the charge in the cartridge and ignited by current flowing through the wire when a contact is closed by the pilot, all in a known manner.

The landing wheel is retained in the retracted position by a suitable pilot released detent means, as for instance that shown in Patent No. 2,552,843 assigned to the assignees of the present invention.

Projection of the landing wheels into down position may be effected by any suitable means such as by gravity, spring action or hydraulic or pneumatic power, or by the use of an explosive cartridge arrangement generally similar to that described for raising the landing wheels, in any event detent means being preferably provided to lock the wheels in down position until released by the pilot prior to raising the wheels.

Figure 3:
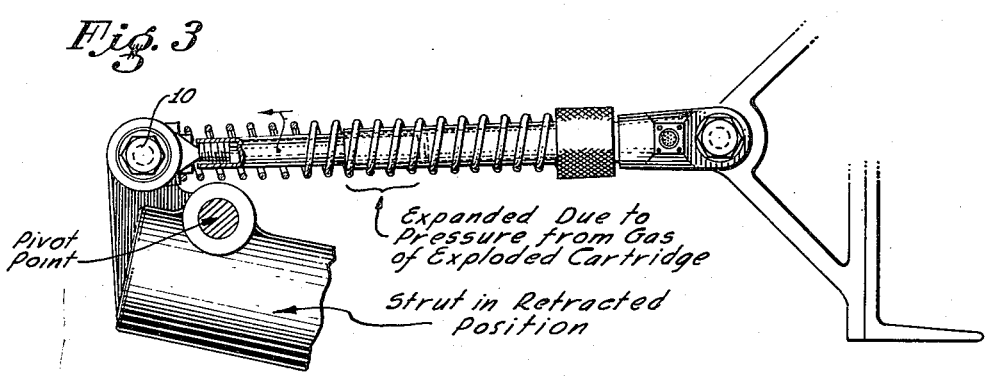
Figure 3 is a view of the parts shown in Figure 2 with the wheel mounting means in retracted position.
Figure 4:
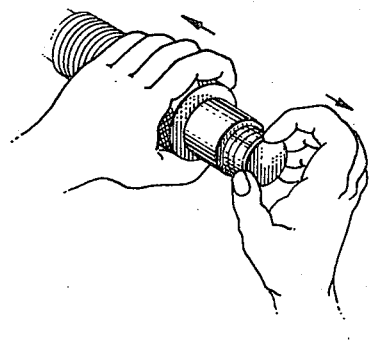
Figure 4 is a detail perspective view showing a spent cartridge being extracted from the form of the invention shown in Figures 2 and 3.

The operation of the wheel retracting means in the embodiment of the invention shown in Figures 2 through 4 is as follows:

When the pilot wishes to retract the landing wheels he will first make sure that the wheels are free to retract and then explode cartridge 21. The gas pressure generated by the explosion will act upon the head 13 of the inner telescopic member 11 and force the inner member outwardly in the outer member, thus bringing strut 7 from the full line position shown in Figure 2 to that shown in Figure 3. It is to be understood that, as is well known in the art in which an explosive cartridge is used to move a piston in one direction, leakage from the cylinder and cooling of the gas is sufficient to relieve the pressure in the cylinder sufficiently to enable movement of the piston in the opposite direction to be effected subsequently.

The manner of reloading the device is shown in Figure 4. The outer tubular member is slid, against the resistance of spring 18, over the inner member, until the breech end 20 clears socket 22, and the telescopic members further telescoped until the head 13 of the inner member pushes the cartridge outward sufficiently to be grasped by the fingers, as shown in Figure 4, removed, and replaced by a fresh cartridge. The telescopic member may then be replaced in the initial position shown in Figure 2.

The modification of the invention shown in Figure 5 while similar in essentials to the embodiment above described, differs therefrom in that recoil operated means are provided to eject spent cartridges and reload with fresh cartridges. Parts similar to the corresponding parts shown in Figures 1 through 4 are indicated by the same numerals with an added "a."

The recoil operated mechanism may be of the well known electrically operated Browning machine gun type set for single shot firing as shown and including a breech casing 26 fitted with a magazine 27 and a connector 28, the extractor bolt 29 projecting through the shell ejection opening 30 in the breech casing.

In order to enable the pilot to eject a defective shell from the breech an emergency cable 31 is connected to the bolt 29 and led around cable pulleys 32 into the pilot's compartment and connected to a pull handle, lever, or treadle, for ready operation from the compartment.

While in order to comply with the statute, the invention has been described in language more or less specific as to structural features, it is to be understood that the invention is not limited to the specific features shown, but that the means and construction herein disclosed comprises the preferred form of putting the invention into effect, and the invention is therefore claimed in any of its forms or modifications within the legitimate and valid scope of the appended claims.

What is claimed is:

1. In an airplane retractable landing gear having wheels each mounted on a strut pivoted to the airplane structure and inner and outer telescopic members secured between the pivoted strut and structure of the airplane, the inner end of the inner member extending in the telescoped condition of the parts to a position adjacent the inner end of the outer member, the inner member being pivotally secured at its outer end to said strut means, landing gear elements comprising: a closure at the inner end of the inner member of the telescopic members; the outer member being open at both ends, the inner end of the outer member constituting a breech adapted to receive an explosive cartridge; a socketed abutment mounted on the structure of the airplane and adapted to receive the breech end of the outer member; resilient means acting on the telescopic members and tending to hold said inner and outer members in extended position with the breech end of the outer member engaged in said socketed abutment; means positioned in said socketed abutment to fire an explosive cartridge mounted in the breech of the cylinder, said telescopic members being arranged so that the breech may be exposed to enable a spent cartridge to be removed therefrom and for loading a fresh cartridge into the breech.

2. Mechanism as set forth in claim 1 and in which said resilient means comprises a coil spring; abutments on the outer and inner members between which said coil spring is positioned under compression, further compression of said spring by sliding said outer member on the inner member enabling the telescopic members to be freed from the socketed abutment and exposing the breech of the outer member for removal of a spent cartrdige therefrom, and loading of a fresh cartridge thereinto.

References Cited in the file of this patent

UNITED STATES PATENTS

| | | |
|---|---|---|
| 1,628,226 | Browning | May 10, 1927 |
| 2,380,611 | Quinnell | July 31, 1945 |
| 2,431,093 | Trich | Nov. 18, 1947 |

FOREIGN PATENTS

| | | |
|---|---|---|
| 482,474 | Great Britain | Dec. 29, 1937 |
| 613,233 | Great Britain | Nov. 24, 1948 |